Figure 1:
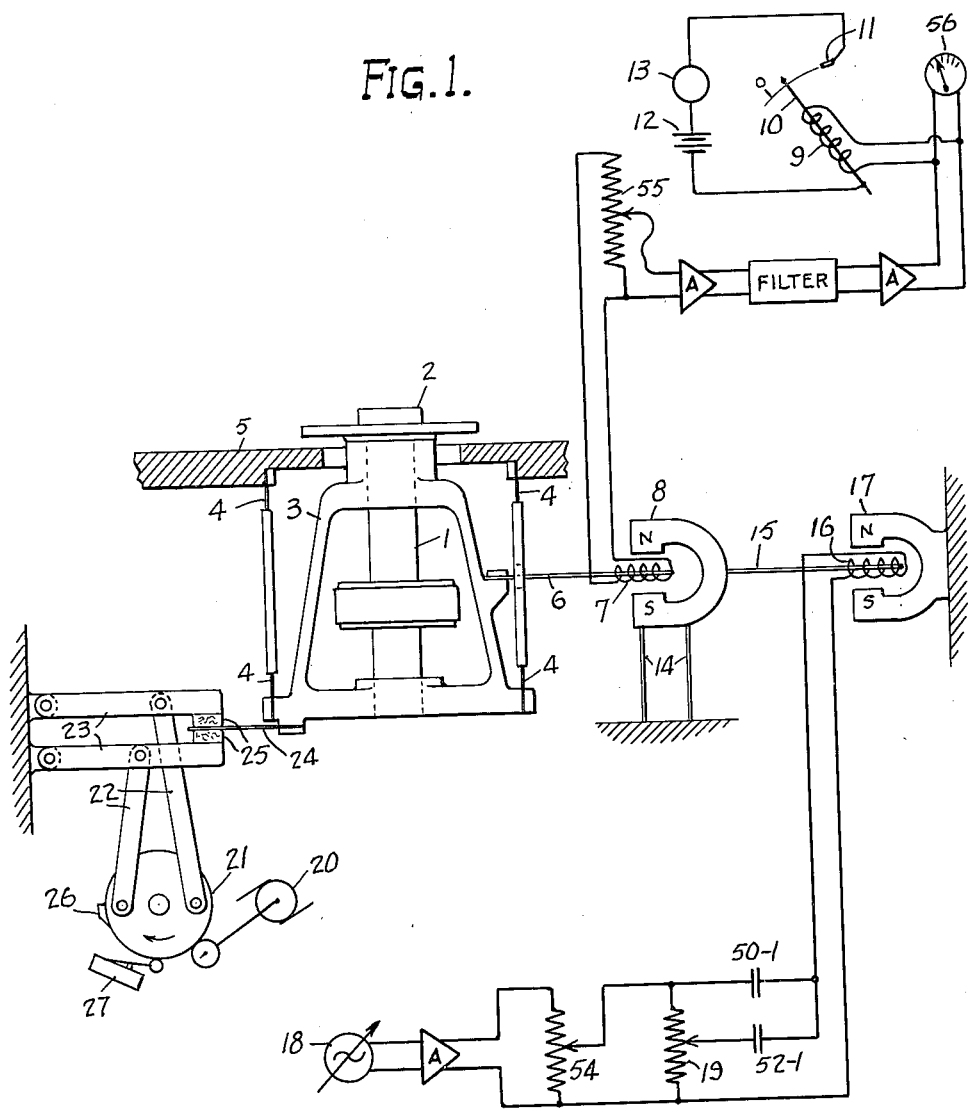

June 6, 1961  R. J. FIBIKAR  2,986,920
BALANCE TESTING MACHINE MONITOR
Filed June 13, 1955  2 Sheets-Sheet 1

INVENTOR.
Robert J. Fibikar
BY Andrus & Scealer
ATTORNEYS.

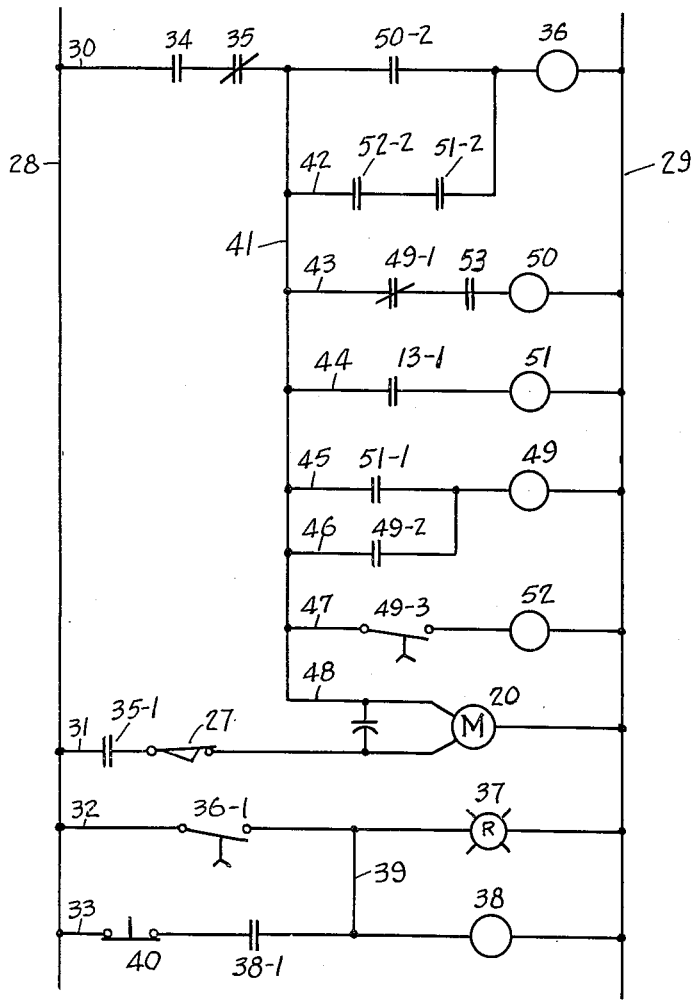

United States Patent Office 2,986,920
Patented June 6, 1961

2,986,920
BALANCE TESTING MACHINE MONITOR
Robert J. Fibikar, Madison, Wis., assignor to Gisholt Machine Company, Madison, Wis., a corporation of Wisconsin
Filed June 13, 1955, Ser. No. 514,961
16 Claims. (Cl. 73—1)

This invention relates to a balance testing machine monitor.

The invention has been applied to provide a predetermined automatic check upon the accuracy of a balance tolerance testing operation of an automatic balance correcting machine and to provide a signal in the event the balance testing part of the machine is functioning inaccurately with respect to a predetermined setting for the tolerance limit of unbalance in the workpiece.

Specifically, the invention can be applied as a monitor for apparatus such as that set forth in application Serial No. 471,627, now abandoned, filed November 29, 1954, by Werner I. Senger and assigned to a common assignee herewith, and in application Serial No. 479,196, now Patent No. 2,891,241, filed December 31, 1954, by the present inventor, and for fully automatic balancing machines, such as set forth in application Serial No. 514,985, filed June 13, 1955, by the present inventor jointly with Werner I. Senger, and assigned to a common assignee herewith.

Where a substantial number of workpieces are balanced per hour in a fully automatic machine it is possible for certain parts of the machine to get out of adjustment or to fail to function properly. So long, however, as the balance inspection cycle functions properly it will be reasonably certain that only properly balanced workpieces will be delivered to the discharge conveyor line. If for any reason the inspection cycle does not operate properly, it is possible to obtain a large number of scrap pieces before the error is discovered unless a monitor is employed as herein proposed.

The present invention provides a monitor that checks the accuracy of operation of the balance inspection device within known tolerance limits periodically during operation of the machine. The check can be made after each ten workpieces have passed through the machine so that only ten scrap pieces are possible, or it can be set to operate for each work cycle or after any suitable number of pieces have passed through the machine.

If inaccuracy in balance inspection is found by the monitor it may shut down the machine and signal the stoppage as by lighting a light in the supervisor's office, ringing a bell, or actuating some other signal.

The monitor of the invention utilizes a part of the machine cycle when the balance inspection device is not normally in operation, as when unloading and loading the balance inspection station. The monitor subjects the input of the balance inspection apparatus successively to vibrations of two predetermined magnitudes, one above the tolerance limit and one below the tolerance limit for which the apparatus is initially set. If the vibrations having a magnitude above the tolerance limit for magnitude of unbalance in the workpiece fails to trip the tolerance limit device of the apparatus, or if the vibrations having a magnitude below the tolerance limit does trip the tolerance limit device of the apparatus, the monitor immediately effects a shut down of the machine and signals the same.

The action of the monitor is superimposed upon the balance inspection device and its accuracy depends largely upon the accuracy or sensitivity of the device. For this purpose it is contemplated to employ a procedure for calibrating the balance inspection device that will greatly reduce the effect of residual unbalance in the workpiece and thereby make possible an effective monitoring of the inspection device.

The accompanying drawings schematically illustrate an embodiment of the invention constituting the best mode presently contemplated for carrying out the invention.

In the drawings:

FIGURE 1 is a schematic illustration of a balance inspection apparatus having the monitor of the present invention; and FIG. 2 is a wiring diagram of that part of the machine having to do with the control and actuation of the monitor.

Referring to FIG. 1, the rotary vertical spindle 1 having a workpiece receiving adapter 2 on its upper end is mounted in suitable bearings in the cradle 3.

The cradle 3 is suspended by suitable straps 4 at its four corners from the machine frame 5. The straps 4 are disposed parallel to one another and provide for free lateral vibration of the cradle 3 in a single plane in response to unbalance vibrations of the workpiece when rotated by spindle 1.

The cradle 3 carries a rod 6 extending horizontally therefrom in the direction of the lateral vibrations of the cradle. The outer end of rod 6 carries a pick-up coil 7 disposed between the poles of a permanent magnet 8 so as to cut the magnetic lines of force when the coil is vibrated relative to the magnet, thereby providing a telescoping coil pickup.

The potential generated by the coil 7 in cutting the magnetic lines of force is passed to a calibration network, then amplified, filtered and again amplified, and passed to a tolerance limit device such as voltmeter relay coil 9.

The needle 10 of the voltmeter relay is actuated by coil 9 away from the zero position in response to the potential imposed upon the coil 9 and which is in direct proportion to the magnitude of the vibrations of cradle 3 and to the amount of unbalance of the workpiece. If the magnitude of the potential applied to coil 9 is sufficient to cause needle 10 to engage the tolerance limit contact 11, a circuit is thereby closed through the battery 12 and the coil of a relay 13.

Relay 13 functions to start an unbalance measuring and correcting cycle for the machine as described in the application Serial No. 514,985, referred to above.

In carrying out the present invention, predetermined relative vibrations are established between coil 7 and magnet 8 similating those resulting from workpiece vibration. For this purpose either the cradle 3 or magnet 8 may be vibrated as by some mechanical or magnetic vibrator means. In the device illustrated, the magnet 8 is mounted on upstanding straps 14 to provide for lateral vibration of the magnet in a direction parallel to rod 6.

The magnet 8 carries a rod 15 extending horizontally therefrom parallel to rod 6 and generally in alignment therewith. The outer end of rod 15 carries an exciter coil 16 disposed between the opposite poles of a permanent magnet 17. Magnet 17 may be either fixed, as shown, or seismographically mounted to avoid transient vibrations from interfering with the pick-up.

Exciter coil 16 is energized by potential from an oscillator 18 of a frequency corresponding generally to the rotational frequency of spindle 1. The potential from oscillator 18 is first amplified, then calibrated, and thereafter adjusted in magnitude by a suitable voltage divider 19 to provide for the successive imposing of pulsating potential upon coil 16 first of one magnitude and then of a different magnitude.

During unbalance inspection of a workpiece, cradle 3 has to be free to vibrate. When monitoring during loading and unloading, cradle 3 is normally clamped against vibration.

For this purpose a motor 20 is suitably geared to actuate a crank 21 that carries links 22 supporting the outer end of corresponding pivotal arms 23.

The cradle 3 carries a strap 24 which may be a thin connector strip of wire of metal or other material extending horizontally therefrom to be rigid in the direction of rod 6 and having its outer end disposed between the jaws of a calmp 25. The jaws of clamp 25 are carried by pivotal arms 23 whereby pivoting of the arms toward each other effects clamping of the strap 24 between the jaws of clamp 25 to secure cradle 3 against vibration during loading and unloading.

Motor 20 is reversible and the motor torque applies a predetermined clamping pressure of clamp 25 upon strap 24 when the motor is energized to actuate the crank 21 in a clockwise direction as shown in FIG. 1. The crank 21 carries an unclamp stop 26 which engages a limit switch 27 to stop the motor 20 when the latter has unclamped and released the strap 24.

Referring to FIG. 2, the control circuit comprises two power leads 28 and 29 between which the several relays and switches are connected to effect the desired control. There are four cross lines extending between leads 28 and 29, these lines being numbered 30, 31, 32 and 33, respectively.

Line 30 contains normally open relay contacts 34 which are closed upon starting of the unloading and loading cycle for the machine wherein a balanced workpiece is removed from adapter 2 and the next workpiece is positioned upon the adapter. Line 30 also contains the normally closed contacts 35 which open when a workpiece has been placed upon adapter 2 and it is time to start rotating spindle 1. The control apparatus for the monitor in the embodiment shown functions only during the time in which both contacts 34 and 35 are closed, as hereinafter described.

Line 31 constitutes the lead for driving motor 20 in the unclamp direction, and contains limit switch 27 for stopping the motor upon a predetermined opening of the clamp 25. Line 31 also contains the normally open spindle start contacts 35—1 which are closed simultaneously with the opening of contacts 35 and vice versa.

Line 32 contains the normally open contacts 36—1 of a time delay relay 36, and which contacts delay in closing upon energization of relay 36 and open fast upon de-energization of the relay. Line 32 also contains the light 37 or other signal means, which is actuated by closing of contacts 36—1.

Line 33 provides a holding circuit for signal 37 and contains a relay 38 to the right of a connecting lead 39 extending between lines 32 and 33 from a point between contacts 36—1 and signal 37 in line 32 to a point between a normally open contact 38—1 and the coil of relay 38 in line 33. By reason of this construction, when contacts 36—1 close, both signal 37 and relay 38 are energized.

Energization of relay 38 effects a closing of contacts 38—1 which closes a holding circuit to maintain the signal 37 regardless of subsequent opening of contact 36—1 as described hereinafter.

A normally closed manual stop button switch 40 is in line 33 adjacent to contacts 38—1 to provide for manual opening of the holding circuit to de-energize the signal 37 and relay 38 and open contacts 38—1, ready for a new cycle of operation, after the cause of the signal has been corrected.

Returning to line 30, it will be noted that contacts 34 and 35, when both are closed, feed current to a vertical lead 41 which has a number of lines 42, 43, 44, 45, 46, 47 and 48 completing corresponding circuits with lead 29.

Line 43 contains a normally closed time delay relay contact 49—1 and also the coil of a relay 50. When contacts 34 are closed relay 50 becomes energized and closes the contacts 50—1 (see FIG. 1) to connect the calibrated predetermined potential from oscillator 18 to coil 16 and thereby immediately impose vibration upon magnet 8 of a magnitude greater than that necessary to cause needle 10 to engage contact 11.

Energization of relay 50 also closes contacts 50—2 in line 30 to energize the time delay relay 36 in that line. If needle 10 fails to engage contact 11 before relay 36 acts to close contacts 36—1, the signal 37 is started indicating that the tolerance limit setting for the inspection apparatus is too high.

If needle 10 engages contact 11 before relay 36 acts to close contacts 36—1, relay coil 13 is energized (see Fig. 1) and closes the normally open contacts 13—1 in line 44 to energize a relay 51.

Energization of relay 51 closes the normally open contacts 51—1 in line 45, thereby energizing time delay relay 49 which immediately opens contacts 49—1 in line 43 and de-energizes relay 50 to open contacts 50—1 and 50—2. Energization of relay 49 establishes a holding circuit by closing normally open contacts 49—2 in line 46 which bypass contacts 51—1.

Energization of relay 49 effects a delayed closing of contacts 49—3 in line 47 and which in turn energizes relay 52 after the circuits have been made ready for applying the lower vibration to magnet 8.

Energizing of relay 52 closes contacts 52—1 (see FIG. 1) which apply to coil 16 a lower magnitude of energization from voltage divider 19 receiving the calibrated predetermined potential from oscillator 18, and that should be insufficient to effect engagement of contact 11 by needle 10.

Relay 52 also closes contacts 52—2 in line 42 and in series with normally open contacts 51—2, and which together by-pass contacts 50—2 in line 30.

In the event the needle 10 engages contact 11 relay 13 closes contacts 13—1 in line 44 and thereby again energizes relay 51 which in turn closes contacts 51—2 and energizes time delay relay 36. Energization of relay 36 closes contacts 36—1 and starts the signal light or other means 37.

In the event the needle 10 does not engage contact 11 before contacts 35 are opened the latter disconnects the control circuits depending from line 30 and all relays are de-energized and all contacts returned to normal awaiting the next cycle of monitoring.

The motor 20 serves to clamp strap 24 upon closing of the contacts 34 in line 30. For this purpose the line 48 extends from lead 41 to the motor to maintain the same energized in a clamping direction throughout the loading and unloading portion of the machine cycle.

Where the clamp 25 is not employed or where the monitoring occurs in a portion of the machine cycle in which the clamp is normally open, as may occur in some machines, the calibration of the output of oscillator 18 may be adjusted to compensate for the vibration of the cradle resulting from vibration of magnet 8.

If it is desired to monitor the inspection apparatus only once after each group of workpieces of a predetermined number have passed through the machine, line 43 should contain the normally open timer contacts 53 which are closed only by a suitable timer mechanism, not shown.

In carrying out the invention the voltage divider 19 is made adjustable to provide a tolerance band for the tolerance limit setting so that error in operation is not signaled in the event the tolerance limit indicator is actuated within the given band of vibration magnitude, and is signaled in the event the tolerance limit indicator is actuated outside the given band of vibration magnitude.

The calibration device 54 for oscillator 18 is made adjustable to provide an excitation for the pick-up equivalent in magnitude to the vibration for a given tolerance limit for unbalance in the workpiece. Calibration device 54 in effect adjusts the position in magnitude of the tolerance band established by voltage divider 19, and where the tolerance band is to be maintained at a given width representing plus and minus tolerance, any change in position for the band as by adjustment of calibrator 54 will require a compensating adjustment for divider 19.

For the purpose of more accurately establishing the position for tolerance limit contact 11 the calibration potentiometer 55 is employed in conjunction with the voltmeter 56.

The potentiometer 55 is connected to transmit the pulsating potential from pick-up coil 7 to the meter relay coil 9. The voltmeter 56 is connected in parallel to meter relay 9 to serve as a visual dial indication of unbalance magnitude.

Where the inherent inaccuracies of the machine leave a possible residual unbalance in the workpiece equivalent to a major portion of the desired tolerance allowable, any attempt to locate contact 11 by utilizing a vibration magnitude corresponding to the desired tolerance limit will incorporate the percentage error of residual unbalance as related to the tolerance limit for unbalance.

By applying a known calibrating weight of unbalance to the sample workpiece being utilized in calibration, considerably greater than and preferably many times the tolerance limit for unbalance and adjusting the potentiometer 55 to a point where the needle of voltmeter 56 will indicate on the meter scale a proportion to the full scale generally corresponding to the relation between the tolerance limit of unbalance and the unbalance resulting from said calibrating weight, then setting contact 11 to be engaged by needle 10 at that point, the error of residual unbalance will have a proportionately less effect upon the tolerance limit setting.

When the above described procedure is utilized in setting contact 11, the tolerance band for the tolerance limit device as established by voltage divider 19 can be made to function more accurately, making the use of a narrow band more practical, and its position as determined by calibrator 54 will also be more accurate.

Various embodiments of the invention may be employed within the scope of the accompanying claims which particularly point out and distinctly claim the subject matter regarded as the invention.

I claim:

1. A monitor for unbalance inspection apparatus to determine the accuracy thereof with relation to a known tolerance limit of unbalance for a workpiece, comprising in combination with unbalance inspection apparatus having a vibration pick-up actuating a tolerance limit tester normally set for a predetermined tolerance limit of unbalance in the workpiece and adapted to successively test individual substantially like workpieces of a series to determine which workpieces have unbalance exceeding said predetermined tolerance limit, means operable between cycles of operation of said inspection apparatus and automatically in synchronism therewith to first apply to said pick-up vibrations of a predetermined magnitude and thereafter to apply vibrations of a predetermined different magnitude to said pick-up, one of said vibration magnitudes being greater than that normally required to actuate said tester to the set position and the other of said vibration magnitudes being less than that normally required to actuate said tester to the set position, and means to signal an error in said tester determined either by actuation of said tester in response to said vibrations of lesser magnitude or by failure of said tester to be actuated in response to said vibrations of greater magnitude.

2. A monitor for unbalance inspection apparatus to determine the accuracy thereof with relation to a known tolerance limit of unbalance for a workpiece, comprising in combination with unbalance inspection apparatus having an electro-magnetic vibration pick-up actuating a tolerance limit tester normally set for a predetermined tolerance limit of unbalance in the workpiece and adapted to successively test individual substantially like workpieces of a series to determine which workpieces have unbalance exceeding said predetermined tolerance limit, electro-magnetic means operable between cycles of operation of said inspection apparatus and automatically in synchronism therewith to first apply to said pick-up vibrations of a predetermined magnitude and thereafter to apply to said pick-up vibrations of a predetermined different magnitude, one of said vibration magnitudes being greater than that normally required to actuate said tester to the set position therefor and the other of said vibration magnitudes being less than that normally required to actuate said tester to said set position, and means responsive to said tester to indicate any error therein determined either by actuation of said tester in response to said vibrations of lesser magnitude or by failure of said tester to be actuated in response to said vibrations of greater magnitude.

3. In a balance inspection machine operative to automatically test successive like articles of a series for unbalance greater than a predetermined tolerance limit of residual unbalance, a vibration pick-up adapted to receive vibrations of a magnitude proportional to the magnitude of unbalance in successive rotary workpieces to be inspected, a tolerance limit tester responsive to said pick-up to determine whether the unbalance in the workpiece exceeds a predetermined tolerance limit, means directly connected to said pick-up to subject said pick-up to vibrations simulating those resulting from unbalance in the workpiece and of a predetermined magnitude relative to said predetermined tolerance limit for the magnitude of unbalance in the workpiece, means automatically initiating actuation of said last-named means upon completion of successive pre-selected cycles of testing, and means responsive to said last named means to indicate when said tolerance limit tester is functioning improperly.

4. In a balance inspection machine, a vibration pick-up adapted to receive vibrations of a magnitude proportional to the magnitude of unbalance in a rotary workpiece to be inspected, a tolerance limit tester responsive to said pick-up to determine whether the unbalance in the workpiece exceeds a predetermined tolerance limit, means to subject said pick-up to vibrations simulating those resulting from unbalance in the workpiece and successively of two different predetermined magnitudes, one of said magnitudes being above that normally corresponding to the tolerance limit for the magnitude of unbalance in the workpiece and the other of said magnitudes being generally below that normally corresponding to said tolerance limit to provide a tolerance band for monitoring said tolerance limit, and means responsive to said last named means to signal in the event said tolerance limit tester fails to make its determination within said tolerance band.

5. The construction of claim 4 in which means are provided to predetermine the test magnitudes of vibration in relation to the predetermined tolerance limit to provide a plus and minus tolerance for actuation of the tolerance limit tester beyond which said signal means is actuated.

6. In a balance inspection machine, the combination of means to inspect a workpiece to determine whether unbalance in the same exceeds a predetermined tolerance limit for unbalance, and means to monitor said first named means comprising means to actuate the same artificially in simulation of actuation from workpiece unbalance, means to control said last named means to simulate an unbalance actuation of at least two different magnitudes, one above and one below said tolerance limit actuation, and means responsive to tolerance limit actuation of said inspection means during monitoring to signal an error in operation of the same exceeding the plus and minus tolerances therefor established by said monitor control means.

7. The combination of claim 6 in which means are provided to adjust the tolerance limit setting for said inspection means, and separate means are provided to adjust said monitor control means to correspond to the adjustment of said setting and to provide a predetermined plus and minus tolerance limit for monitoring said setting.

8. The combination of claim 6 in which means are provided to adjust and calibrate the tolerance limit setting for said inspection means, comprising a visual meter connected to respond to actuation of said inspection means, means to impose upon said inspection means an actuation corresponding to many times the tolerance limit for unbalance in the workpiece, means to adjust the determination obtained by said inspection means while said last named means is operating to a predetermined tolerance limit as indicated by said visual meter, and means to set said inspection means to indicate a tolerance limit of unbalance at the point of said last named adjustment, whereby the percentage of error arising from residual unbalance in the workpiece is substantially reduced in the calibration of said tolerance limit setting and is correspondingly reduced as to the calibration of said monitoring means.

9. In a device of the class described, a balance inspection means for determining whether a workpiece has unbalance exceeding a predetermined tolerance limit, a visual meter connected to respond to actuation of said inspection means, means to subject said inspection means to an actuation corresponding to many times that resulting from actuation by a workpiece that has unbalance within the given tolerance limit, means to adjust the determination obtained by said inspection means to a predetermined tolerance limit as indicated by said visual meter during operation of said last named means, and means to set said inspection means to indicate a tolerance limit of unbalance at the point of said adjustment, whereby the percentage of error arising from residual unbalance in the workpiece is substantially reduced in the calibration of said tolerance limit setting.

10. The construction of claim 9 and a monitoring device associated with said inspection means and adapted to actuate the same in simulation of unbalance in the workpiece and to determine in response to said simulated actuation the accuracy of said setting.

11. A balance inspection machine operative to determine whether the unbalance of a tested object lies within a predetermined tolerance, comprising an electromagnetic voltage generator for transformation of unbalance vibrations into electric voltage impulses, a measuring instrument for said voltage impulses, a signal device responsive to said measuring instrument upon said impulses reaching an adjusted predetermined upper tolerance limit of magnitude, and an electro-magnetic vibration generating means which when the balance inspection machine is not being operated is directly connected to said voltage generator to actuate said voltage generator and generate voltage impulses of predetermined amplitude to test the accuracy of signal actuation by the machine.

12. The machine according to claim 11, in which said voltage generator is a telescoping coil having a magnet and a pick-up coil subject to relative movement in response to vibrations of the object being tested, and said vibration generating means produces relative vibrations between said magnet and pick-up coil independently of the object.

13. The machine according to claim 11, in which said voltage generator is a telescoping coil having a normally stationary magnet and a movable pick-up coil connected to receive vibrations of the test object, and said vibration generating means is connected to said magnet to vibrate the same relative to said pick-up coil, and means are provided to secure said pick-up coil against vibration when said vibration generating means is actuated.

14. The machine according to claim 11, in which said vibration generating means is operable between cycles of operation of said machine to first actuate said measuring instrument by vibrations of a predetermined magnitude and thereafter vibrations of a predetermined different magnitude, one of said vibration magnitudes being greater than that normally required to actuate said measuring instrument to the signal operating position and the other of said vibration magnitudes being less than that normally required to actuate said measuring instrument to the signal operating position.

15. The machine according to claim 14, in which means are provided to predetermine the test magnitudes of vibration in relation to the predetermined tolerance limit to provide a plus and minus tolerance for actuation of the measuring instrument beyond which said relay switch is actuated.

16. The machine according to claim 11, in which said signal means includes a visual meter, and said vibration generating means includes means to impose vibrations upon said voltage generator corresponding to many times the tolerance limit for unbalance in the workpiece, means to adjust the determination obtained while said last named means is operating to a predetermined tolerance limit as indicated by said visual meter, and means to set said measuring instrument to indicate a tolerance limit of unbalance at the point of said last named adjustment, whereby the percentage of error arising from residual unbalance in the workpiece is substantially reduced in the calibration of the tolerance limit setting of the measuring instrument.

References Cited in the file of this patent

UNITED STATES PATENTS

| | | |
|---|---|---|
| 2,074,840 | Greentree | Mar. 23, 1937 |
| 2,656,710 | Weaver et al. | Oct. 27, 1953 |
| 2,661,622 | Severs | Dec. 8, 1953 |
| 2,663,184 | Merrill et al. | Dec. 22, 1953 |